(12) United States Patent  (10) Patent No.: US 7,433,076 B2
Richer  (45) Date of Patent: Oct. 7, 2008

(54) MACRO-PIXEL IMAGE RENDERING APPARATUS AND ASSOCIATED METHODS

(75) Inventor: Paul Richer, St-Jérôme (CA)

(73) Assignee: Technologies Photogram Inc., Lachenaie (CA)

( * ) Notice: Subject to any disclaimer, the term of this patent is extended or adjusted under 35 U.S.C. 154(b) by 1209 days.

(21) Appl. No.: 10/621,574

(22) Filed: Jul. 18, 2003

(65) Prior Publication Data

US 2005/0012945 A1    Jan. 20, 2005

(51) Int. Cl.
   *G06F 15/00*    (2006.01)
(52) U.S. Cl. ............... 358/1.9; 358/3.03; 358/3.06; 358/3.28; 358/457; 358/455; 358/465; 395/109
(58) Field of Classification Search ............. 358/1.9, 358/3.03, 3.06, 3.28, 457, 455, 465; 395/109
   See application file for complete search history.

(56) References Cited

U.S. PATENT DOCUMENTS

| | | | |
|---|---|---|---|
| 3,742,129 A | | 6/1973 | Roberts et al. |
| 4,032,978 A | | 6/1977 | Wong |
| 4,595,948 A | | 6/1986 | Itoh |
| 4,809,063 A | | 2/1989 | Moriguchi |
| 5,594,839 A | | 1/1997 | Shu |
| 5,625,756 A | * | 4/1997 | Campbell ............... 358/1.9 |
| 6,020,978 A | | 2/2000 | Cooper et al. |
| 6,426,802 B1 | | 7/2002 | Lin |

| | | |
|---|---|---|
| 2002/0036803 A1 | 3/2002 | De La Torre |
| 2003/0164441 A1 * | 9/2003 | Lyon et al. ............... 250/208.1 |

FOREIGN PATENT DOCUMENTS

EP    0791895    2/1997

OTHER PUBLICATIONS

IBM Technical Disclosure Bulletin, vol. 26 No. 3B Aug. 1983 XP-002258827.
Dithering Methods of color images directly applicable to run-length coding, Shigeo, Kato; Yasuhiko Yasuda, vol. 1, Nov. 15-18, 1987, pp. 431-435 XP-002258828.

* cited by examiner

*Primary Examiner*—Twyler L. Haskins
*Assistant Examiner*—Michael Burleson
(74) *Attorney, Agent, or Firm*—Benoît & Co.

(57) ABSTRACT

A macro-pixel used in an image rendering process for forming an image using a matrix of macro-pixels. The macro-pixel comprises a plurality of rectilinear parallel rows. All rows extend across the matrix in the same direction and each one of the rows is capable of at least partially adopting at least one of a color state and an off state. The on state includes the presence of color while the off state includes the absence of color. The on state comprises non-key and/or key colors. The non-key colors can be cyan, magenta, yellow, and/or any other color while the key color is normally black. The macro-pixel also includes columns formed by micro-pixels which may be turned on in a predetermined order. The predetermined order permits maximum distance between rows used for key colors and rows used for non-key colors.

62 Claims, 5 Drawing Sheets

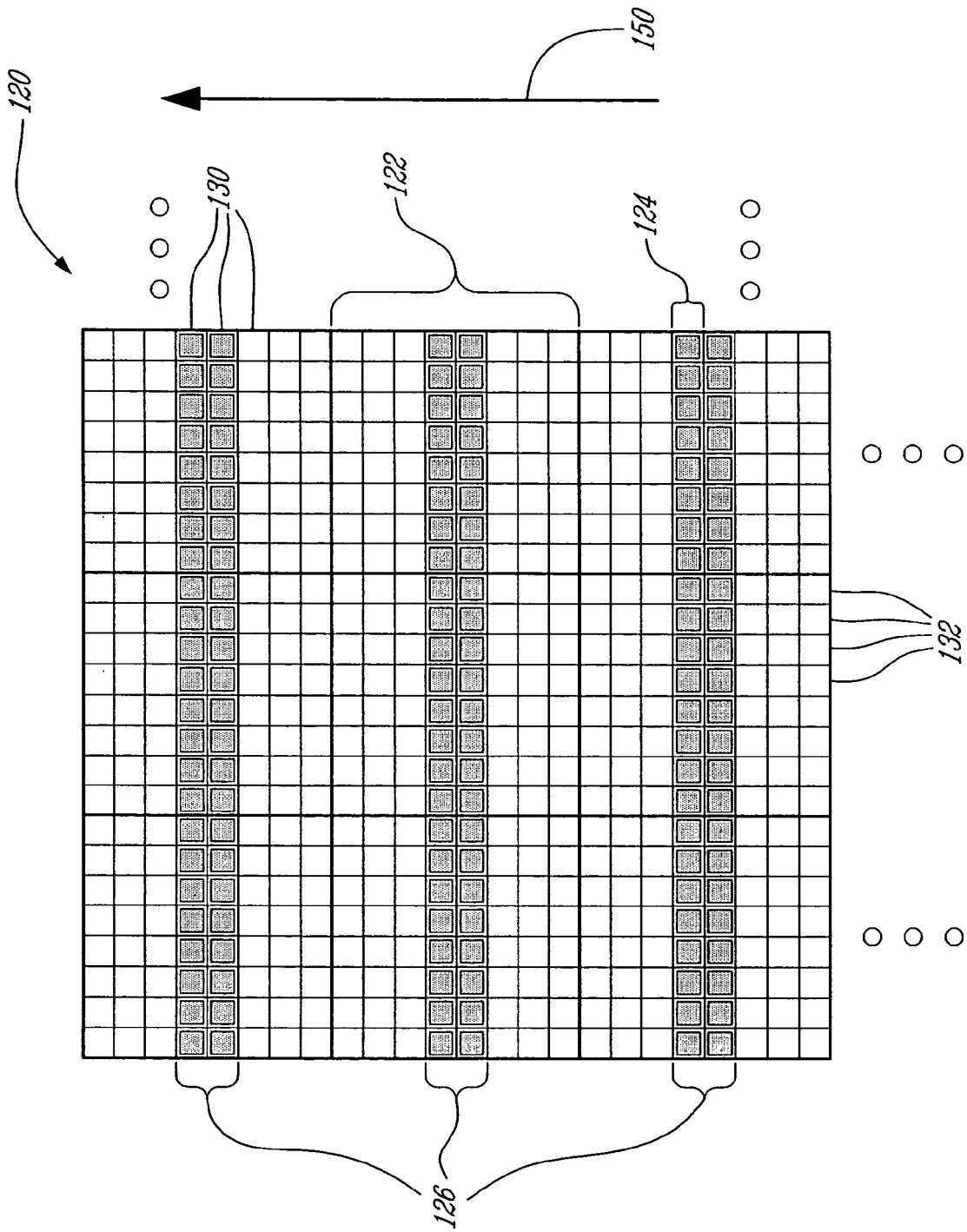

MACRO-PIXEL IMAGE RENDERING APPARATUS AND ASSOCIATED METHODS

FIELD OF THE INVENTION

The present invention relates to the field of processes used for image rendering. More specifically, the present invention is concerned with a macro-pixel image rendering apparatus and methods that may be used in printing processes.

BACKGROUND OF THE INVENTION

Since the beginning of full color lithographic offset printing, the concept of using different screen angle for each color has been applied to deal with press imperfections causing skew and displacement of basic colors, relative to each other. While it limits the possibilities of visible moiré effect, it also causes steady cyclic tint and brightness noise, and limits dark color saturation and linearity. Stochastic and/or FM screening methods solve the moiré problem, but add random tint, brightness noise and non-linearity, while increasing dot gain by multiplying the amount of outer edges of dot surface.

Therefore, in spite of the efforts in the field, there is a need for improved macro-pixels and associated image rendering methods.

SUMMARY OF THE INVENTION

Over recent years, printing precision and resolution in lithographic, ink jet, thermal transfer, laser printing, and many other type of printing color reproduction systems, have greatly improved. With the present availability of offset press having stable and precise skew, and Computer-To-Plate technologies with precise repeatability, AM, FM, stochastic and all combinations of these three halftone screening processes can be replaced with a simple parallel line shaped macro-pixel technique. The macro-pixel technique disclosed herein usually has three (but can also be from one to any number) superimposed basic color inks, and usually a black or dark ink, offset from the other colors perpendicularly to the macro-pixel line direction by half the macro-pixel size. Because actual web and sheet fed presses can provide stable and precise skew repeatability from color station to color station, there is no more need to render a halftone screen using different angle for each color ink.

Some improvements of the present invention over prior art are diminution of "dot-gain" and "non-linearity", increase in image definition and color precision, better control over color management, less critical "make-ready", better color stability on long printing-runs, increased color depth, reproduction of a level of detail similar to photographic reproduction with printing equipment as imprecise as web fed presses mostly limited to a macro-pixel frequency of 175 Line Per Inch (L.P.I.). It can provide an immediate technology upgrade for a printer's entire printing equipment park.

More specifically, by using the present invention's original color reproduction system, the source of macro-pixel frequency interference noise is eliminated, and therefore color photographic reproduction is very closely emulated. The total elimination of frequency interference noise resulting from prior art systems is even more appreciable when rendering images or printing animated, interactive and/or auto-stereoscopic 3D lenticular image, since the old process produces a lot more interferences with the addition of the lenticular lens' frequency, angle and magnification. Like true stochastic screening, the image rendering method described herein eliminates moiré patterns. Also, it is not sensitive to bad registration. But unlike stochastic screening, the image rendering method described herein has a low dot gain generation factor, and a much more linear transfer curve.

An additional advantage of the present invention, specially when applied to animated, interactive and/or auto-stereoscopic 3D lenticular printing, is the possibility to obtain brighter images, delivering more white surface light reflection (or transmission, for backlit image) than any other full color ink printing process, without sacrifice of color depth, gamut range or linearity. For silk-screen applications, the image rendering method disclosed herein is ideal for print resistance to washing and other causes of wear, because it exposes less ink spot edges to the effects of detergent and friction.

A low and constant effective dot gain is one of the factors that gives the present invention more color precision and depth than stochastic and FM screenings, while producing much less noise.

By choosing the image rendering method described herein, e.g., color reproduction printing instead of photographic reproduction, considerable cost reductions are possible while obtaining relatively comparable results, in term of quality. Of course, the color gamut is not the same (Red, Green, Blue (RGB) vs. Cyan, Magenta, Yellow, Key (CMYK)), but more basic color inks may be added to extend it far beyond the photographic process limits.

All these innovations can be applied to standard and digital lithographic printing, to silk-screening, to all digital raster printing including, but not limited to, laser printing, inkjet printing, thermal transfer printing, photographic printing, and to animated, interactive and/or auto-stereoscopic 3D lenticular printing, reflective as well as transmissive.

In one of its embodiments, the present invention relates to an image rendering halftone macro-pixel used in an image rendering process for forming an image using a matrix of macro-pixels. The macro-pixels comprise a plurality of rectilinear parallel rows or column. All rows extend across the matrix in the same direction and each one of the rows is capable of adopting, at least partially, at least one of an on state and an off state. The on state may be any color but it is usually cyan, magenta, yellow or black. The color black (or the darkest color) is normally used as the key color; that is, the key color is used to form a contone digital image's darkest parts. The other colors are the non-key colors. The off state includes the absence of color.

In another embodiment, each row of the macro-pixel of the present invention is divided into micro-pixel forming columns across the matrix. Each micro-pixel can adopt an on or an off state.

In a preferred embodiment, the non-key pixels (or rows) are turned on in a predetermined order and the key pixels are turn on in a predetermined order different than the predetermined order for the non-key pixels so that in all situation rows of key micro-pixels are farthest from rows of non-key micro-pixels.

In another preferred embodiment, the present invention provides an image rendering method for forming an image. The method comprises using a matrix of macro-pixels, each macro-pixel having a plurality of rectilinear parallel rows, all rows extending across the matrix in the same direction. The method further comprises and each one of the rows at least partially adopting at least one of an on state and an off state, wherein the on state includes the presence of color and the off state includes the absence of color, to thereby form the image.

In another embodiment, macro-pixel synchronized high density digital data watermark encoding is performed directly at the screening level while bypassing any dithering process that would have normally been done if needed. The digital data can be either totally replacing or modulating (with control over modulation bias and amplitude) one or more color channels (usually C, M, Y or K) of the part of the contone image to which it is applied. The data can be read using scanners of all kinds with color filtering to decode only the color channel(s) on which the data has been encoded. Thanks to the present invention, the total absence of macro-pixel induced noise in the resulting image provides a perfect medium for high density digital data watermarking or any digital data that has to be embedded in a printed image. Of course, better scanning results are obtained when imposing the watermark over a part of the contone image that is homogeneous or with very little difference between adjacent macro-pixels.

BRIEF DESCRIPTION OF THE DRAWINGS

In the appended drawings:

FIG. 2A is a schematic diagram of a macro-pixel showing the pixels selected for adopting the color state in accordance with an embodiment of the invention;

DETAILED DESCRIPTION OF THE INVENTION

Figure 1:
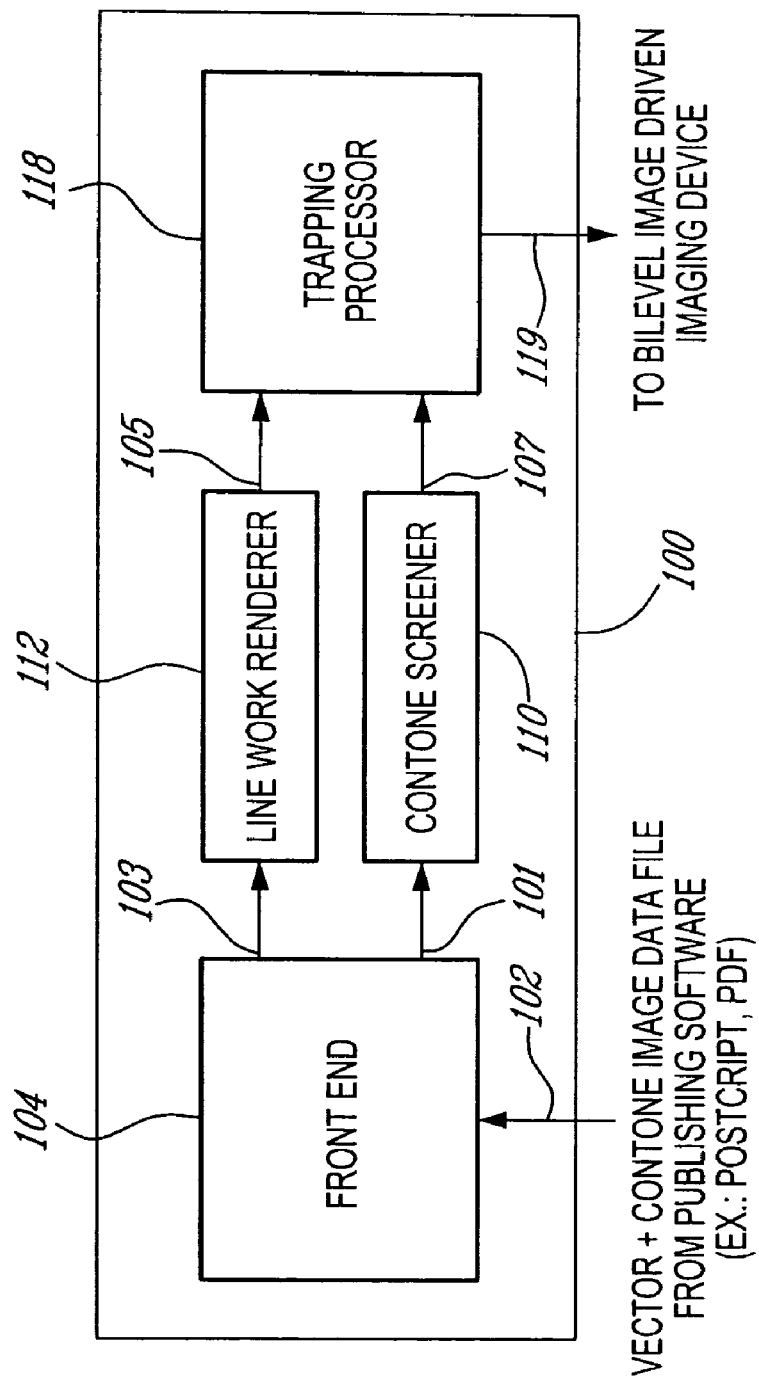
FIG. 1 is a block diagram showing a raster image processor in which the present invention is embodied.

FIG. 1 illustrates a standard Raster Image Processor (RIP) 100 block diagram and its data flow from the input 102 of the RIP software front end 104 to the output 119 of merge and trapping processor 118 which is fed to a bilevel image driven imaging device (not shown). In a preferred embodiment, the process described herein takes place in the contone screener 110.

As shown in FIG. 1, image files containing composition of color separated (usually CMYK) vectorized drawings, texts, fonts and/or contone pictures, coming from a publishing software in the form of Postscript, PDF or other popular electronic publishing format, are loaded (input 102) in the RIP front end 104. There, the file is interpreted and separated in its line work part 103 (vector based drawing and text) and its color separated contone part 101, and these parts (101 and 103) are fed to the line work renderer 112 and the contone screener 110 respectively. The line work renderer 112 and the contone screener 110 respectively produce 1 bit line work image data 105 and 1 bit contone image data 107. Outputs 105 and 107 are fed to the merge and trapping processor 118 which superimposes the 1 bit line work image data 105 on top of the 1 bit contone image data 107, said superimposition being ruled by predetermined trapping settings, if any.

Only the functionality associated with the contone screener 110 will be further described herein. Other parts of the RIP 100 are well know to those skilled in the art and will not be further described.

Figure 2B:
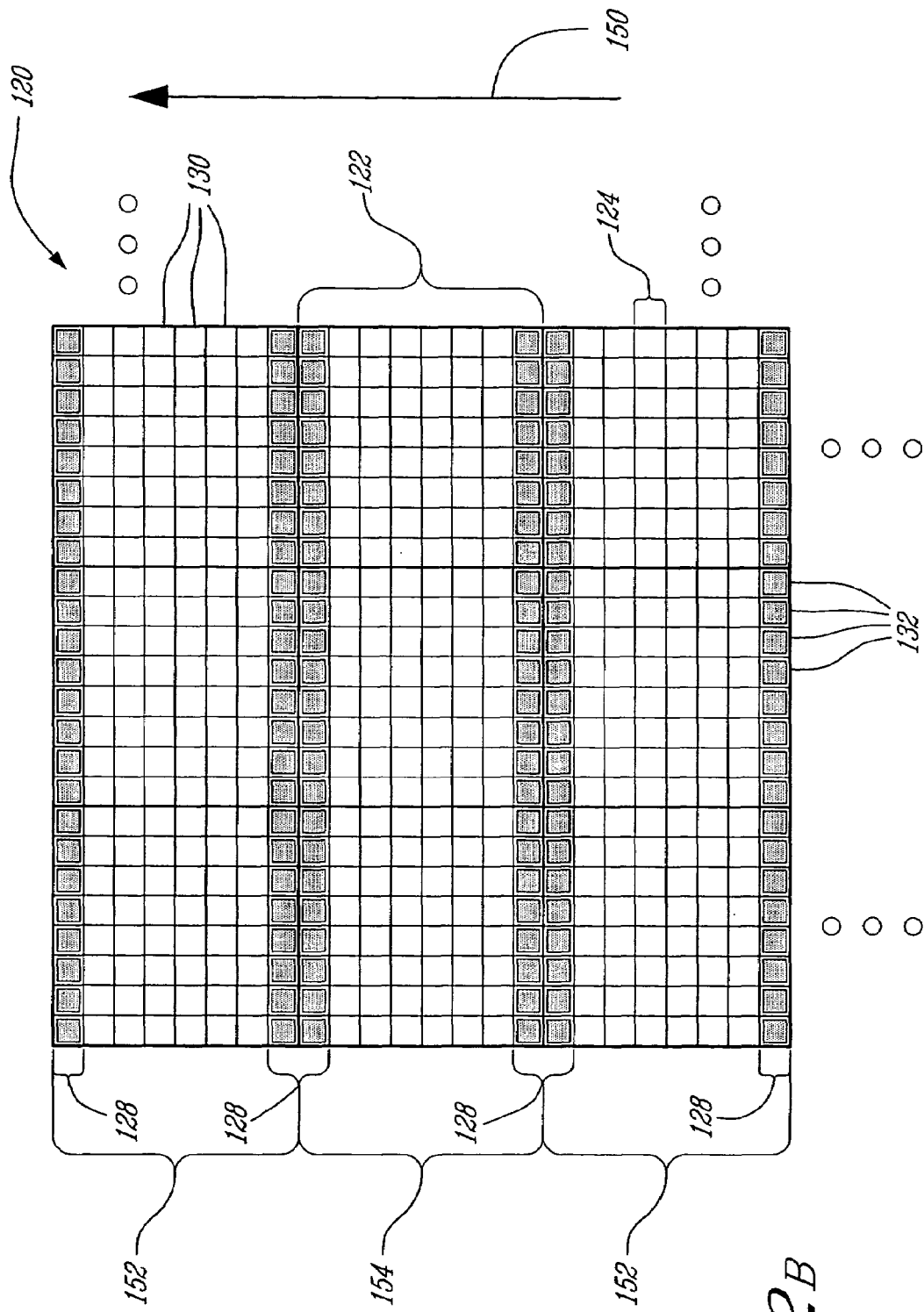
FIG. 2B is a schematic diagram of a macro-pixel showing the pixels selected for adopting the key (or black) state in accordance with an embodiment of the invention.

Various preferred embodiments of printing macro-pixels 122 used for forming an image (not shown) in image rendering processes are shown in FIGS. 2A, 2B, 3A, 3B, 4A and 4B. As shown in FIGS. 2a and 2b, a partial matrix 120, which will form the desired image, is formed of macro-pixels 122. Each macro-pixel 122 has a plurality of rectilinear parallel rows 130. All rows 130 extend across matrix 120 in the same direction. The macro-pixels 122 further comprise an upper edge 134 and a lower edge 136 as well as a left edge 138 and a right edge 140.

In a preferred embodiment rows 130 are horizontal (i.e., parallel to the upper and lower edges (134, 136) of macro-pixel 122). Other embodiments include rows 130 which are vertical, at an angle of 26.565051177 degrees, at an angle of 45 degrees, or at an angle of 63.434948823 degrees. In general, better images are obtained when rows 130 are perpendicular to the continuous linear production direction as indicated by arrow 150. The continuous linear production direction usually represents the most stable direction between each printing color station, that is, the direction that causes less error in color position.

Each one of rows 130 is capable of at least partially adopting an on state and an off state. The on state includes the presence of color and the off state includes the absence of color. The on state comprises non-key and key colors. The non-key colors can be cyan, magenta and yellow (CMY) while the key color is normally black or the darkest color in a possible selection of colors.

Macro-pixels 122 also include rectilinear parallel columns 132 extending across matrix 120 in the same direction. In a preferred embodiment, each macro-pixels comprises 64 micro-pixels 124 arranged in eight (8) rows 130 and eight (8) columns 132.

As stated earlier, the macro-pixel technique disclosed herein has, in a preferred embodiment, three (but can also be from one to any number) superimposed basic non-key color inks, and a key color ink, usually a black or dark ink, offset (or shifted) from the other non-key colors perpendicularly to the macro-pixel 122 row direction by half the macro-pixel size. FIG. 2A shows an embodiment where the center rows 126 of each macro-pixel 122 are used for non-key color inks, usually 'CMY', at 25% surface coverage (dot gain excluded). The non-key color center positions 126 are not shifted. In this specific embodiment, macro-pixels 122 comprise 64 micro-pixels 124. A person skilled in the art would understand that the number of micro-pixels 124 can start a minimum of 2 micro-pixels 124 and that there is no maximum.

In the same embodiment (as the one of FIG. 2A), FIG. 2B shows the edge rows 128 used for key color black or darkest ink, usually named 'K', at 25% surface coverage (dot gain excluded). The key color center position is therefore shifted.

By rendering all inks in parallel, the source of screening frequency/angle interference noise is eliminated thereby rendering images of color photographic reproduction quality. The total elimination of screening frequency interference noise is even more appreciable when printing animated, interactive and/or auto-stereoscopic 3D lenticular image; since the old multi-angular process produces a lot more interferences with the addition of the lenticular lens' frequency, angle and magnification.

By shifting the black ink row position 128 by half the macro-pixel size relative to the colored inks, the maximum gap between the black ink (key color) and the colored inks (non-key color) is obtained. The black ink (key color) is therefore less likely to overlap the colored inks (non-key color) and thereby lessens the chances of reducing their saturation in dark color situations. This also provides better dark color linearity, higher density and wider color gamut than any other macro-pixel shape.

By using line shaped macro-pixel, the least dot gain (percentage of exposed surface enlargement, from digital representation to actual result) possible is produced since the amount of corner dot gain is limited.

On stable sheet feed offset press, resolution up to 1200 LPI×1200 LPI can be achieved using a 2400 DPI×4800 DPI CTP by applying error diffusion dithering, like Floyd-Steinberg, Stucki or Ostromoukhov algorithm, to the separated color continuous tone digital image data while bit reduction quantization is performed. Dithering is needed when there are not enough micro-pixels 124 in a macro-pixel 122 to reproduce the full dynamic range of the separated color continuous tone digital image. This is the case with screening higher than 150 LPI×300 LPI on a 2400 DPI×4800 DPI imaging device with 32 bit/pixel (4×8 bit) image data, or when image data is 48 or 64 bit deep (more than 8 bit per color).

Some applications of prior art in the lenticular printing field uses stochastic or FM screening that generates noise like shapes which, even though almost invisible to the bare eye, become visible when seen through a magnifying lenticular lens. The resulting lenticular image contains an apparently random noise, comparable or even worst than the cyclic noise of standard multi-angle screening.

Figure 3A:
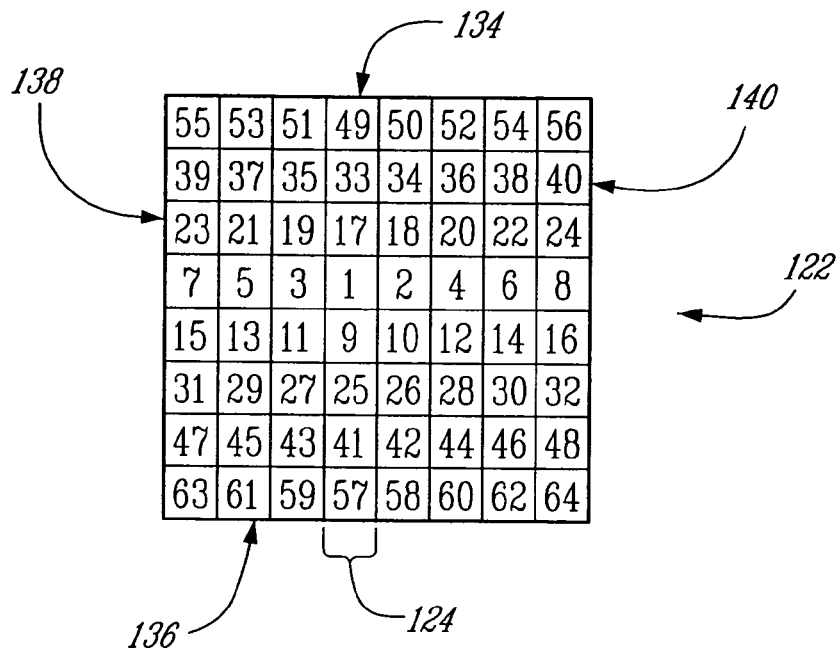
FIG. 3A is a schematic diagram showing, in accordance with an embodiment of the invention, the order in which the color micro-pixels are turned on to produce a desired macro-pixel.
Figure 3B:
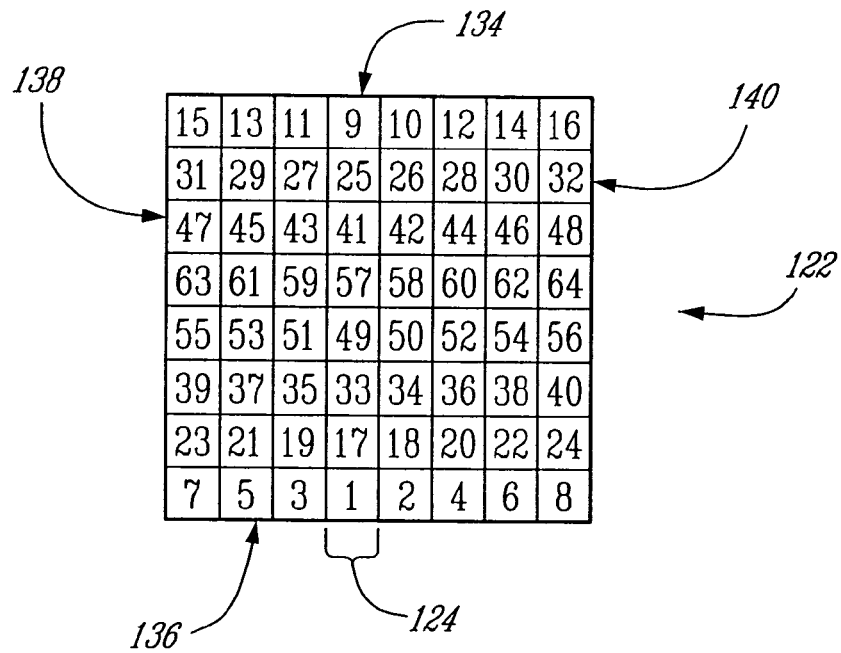
FIG. 3B is a schematic diagram showing, in accordance with an embodiment of the invention, the order in which the key (black or darkest) micro-pixels are turned on to produce a desired macro-pixel.

Now referring to FIGS. 3A and 3B, a preferred embodiment for a predetermined order in which the micro-pixels 124 change their state from off to on is shown and described herein. The reader will understand that FIGS. 3A and 3B together form a complete matrix used for producing an image. The objective of having a predetermined order is to have as much distance as possible between rows used for key colors (i.e., 126 of FIG. 2A) and rows used for non-key colors (i.e., 128 of FIG. 2B) and thereby to reduce interference between them.

FIG. 3A illustrates an example of level progression of the present invention (e.g., first predetermined order) used for non-key color ink, usually 'CMY', from 1/64 (1.5625%) to 64/64 (100%) coverage. For example, 25% coverage turns on micro-pixels in positions 1 to 16 inclusive which corresponds to the two rows 130 which are in the center of macro-pixel 122.

FIG. 3B illustrates an example of level progression of the present invention (e.g., second predetermined order) used for key color black or darkest ink, usually named 'K', from 1/64 (1.5625%) to 64/64 (100%) coverage. For example, 50% coverage turns on micro-pixels in positions 1 to 32 inclusive.

A reader will therefore understand that the position numbers within macro-pixel 122 correspond to the order in which micro-pixels 124 are turned on. The first predetermined order (shown in FIG. 3A) begins with one of the micro-pixels 124 in a row 130 located at a substantial equidistance from the upper and lower edges (134, 136) thereby defining a first order micro-pixel. In a preferred embodiment, the first order micro-pixel is in a position at a substantial equidistance from said left and right edges (138, 140), namely the micro-pixel at position 1 in FIG. 3A.

The first predetermined order then continues with the micro-pixel in the off state which is closest to the substantial left and right edge equidistance until all micro-pixels in a row have adopted the on state, namely micro-pixel in position 2, then micro-pixel in position 3 and so on until micro-pixel in position 8 is turned on. After all micro-pixels in a row have adopted the on state, the first predetermined order further continues, in a row which is the next one closest to the substantial upper and lower edge equidistance, with the micro-pixel in the off state which is closest to said substantial left and right edge equidistance, namely the micro-pixel at position 9, and so on.

The second predetermined order (shown in FIG. 3B) begins with one of the micro-pixels 124 in a row 130 closest to one of said upper and said lower edges (134, 136) thereby defining a second order micro-pixel. In a preferred embodiment, the second order micro-pixel is in a position at a substantial equidistance from said left and right edges (138, 140), namely the micro-pixel at position 1 in FIG. 3B.

The second predetermined order continues with the micro-pixel in the off state which is closest to said substantial left and right edge equidistance until all micro-pixels in a row have adopted said on state, namely micro-pixel in position 2, then micro-pixel in position 3 and so on until micro-pixel in position 8 is turned on. After all micro-pixels in a row have adopted the on state, the second predetermined order further continues, in a row which is next one closest to the other one of the upper and the lower edges, with the micro-pixel in the off state which is closest to said substantial left and right edge equidistance, namely the micro-pixel in position 9, and so on.

Figure 4A:
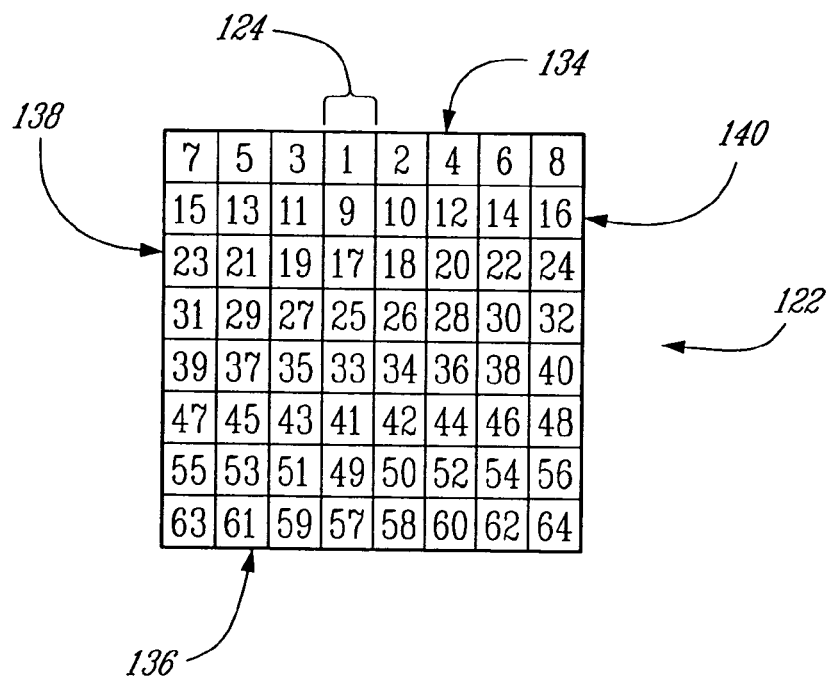
FIG. 4A is a schematic diagram showing, in accordance with another embodiment of the invention, the order in which the color micro-pixels are turned on to produce a desired macro-pixel.
Figure 4B:
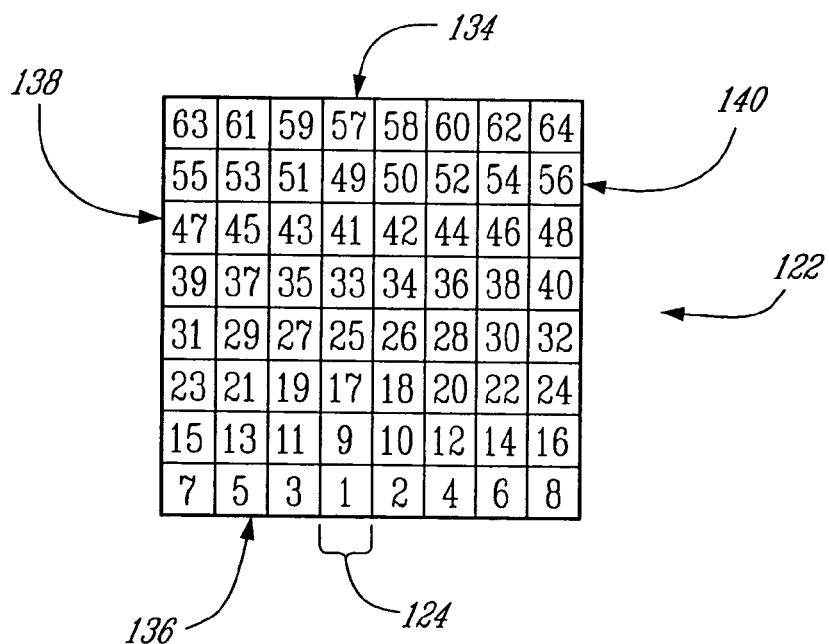
FIG. 4B is a schematic diagram showing, in accordance with another embodiment of the invention, the order in which the key (black or darkest) micro-pixels are turned on to produce a desired macro-pixel.

Now referring to FIGS. 4A and 4B, another preferred embodiment for a predetermined order in which the micro-pixels 124 change their state from off to on is shown and described herein. The reader will understand that FIGS. 4A and 4B together form a complete matrix used for producing an image. The predetermined order shown in FIGS. 4A and 4B further reduces the interference between non-key and key color rows. Returning to FIG. 2B, matrix 120 is shown with odd 152 and even 154 numbered horizontal lines.

FIG. 4A illustrates an example of a level progression according to the present invention (e.g., first predetermined order) used for non-key color ink (usually 'CMY') for even numbered lines, and used for key color ink for odd numbered lines, from 1/64 (1.5625%) to 64/64 (100%) coverage, using matrix line parity based position swapping over-sampling (resulting in screening frequency being half the effective optical resolution in one direction). For example, 25% coverage turns on micro-pixels in positions 1 to 16 inclusive which corresponds to the two rows 130 which are in the closest to the upper edge 134 of macro-pixel 122.

FIG. 4B illustrates an example of level progression of the present invention (e.g., second predetermined order) used for key color black or darkest ink for even numbered lines, usually named 'K', and used for non-key color ink for odd numbered lines, from 1/64 (1.5625%) to 64/64 (100%) coverage, using matrix line parity based position swapping over-sampling (resulting in screening frequency being half the effective optical resolution). For example, 50% coverage turns on micro-pixels in positions 1 to 32 inclusive which corresponds to the four rows 130 which are closest to the lower edge 136 of macro-pixel 122.

In the embodiment of FIGS. 4A and 4B, the micro-pixels 124 in said odd lines 152 are capable of adopting the on state according to either one of a first predetermined order (FIG. 4A) and a second predetermined order (FIG. 4B), and said even lines 154 are capable of adopting said on state according to the other one of a first predetermined order (FIG. 4A) and a second predetermined order (FIG. 4B).

The first predetermined order of FIG. 4A begins with one of the micro-pixels in a row closest to the upper edge 134 thereby defining a first order micro-pixel. The second predetermined order of FIG. 4B begins with one of the micro-pixels in a row closest to the lower edge 136 thereby defining a second order micro-pixel.

In a preferred embodiment, the first and second order micro-pixels are in a position at a substantial equidistance from the left edge 138 and the right edge 140, namely the micro-pixel 124 in position 1 of their respective FIGS. 4A and 4B. The first and second predetermined orders continue, in their respective rows, with the micro-pixel in the off state which is closest to the substantial left and right edge equidistance until all micro-pixels in a row have adopted the on state, namely micro-pixel in position 2, then micro-pixel in position 3 and so on until micro-pixel in position 8 is turned on.

After all micro-pixels in a row have adopted the on state, the first predetermined order further continues, in a row which is next one closest to said upper edge, and the second predetermined order further continues, in a row which is next one closest to the lower edge, with the micro-pixel in the off state which is closest to the substantial left and right edge equidistance, namely the micro-pixel in position 9 in both FIGS. 4A and 4B, and so on.

The person skilled in the art will understand that when the number of rows and columns is even, and thereby when none of the rows 130 of micro-pixel 124 is exactly equidistant from the upper and lower edges (134, 136) respectively, one of the two center rows is selected according to a rule (e.g., always the upper row) or in a random fashion. The same method for resolving equidistance conflicts applies within a row to micro-pixels being exactly equidistant from left and right edges (138, 140).

A person skilled in the art will understand that the first and a second predetermined order as described above can be interchanged without departing from the spirit of the invention. That is, the first predetermined order could be used for key ink color states or ink (in even numbered lines), and the second predetermined order could be used for non-key color states or ink (in even numbered lines).

In another embodiment, macro-pixel synchronized high density digital data watermark encoding is performed directly at the screening level while bypassing any dithering process that would have normally been done if needed. The digital data can be either totally replacing or modulating (with control over modulation bias and amplitude) one or more color channels (usually C, M, Y or K) of the part of the contone image to which it is applied. The data can be read using scanners of all kinds with color filtering to decode only the color channel(s) on which the data has been encoded. Thanks to the present invention, the total absence of macro-pixel induced noise in the resulting image provides a perfect medium for high density digital data watermarking or any digital data that has to be embedded in a printed image. Of course, better scanning results are obtained when imposing the watermark over a part of the contone image that is homogeneous or with very little difference between adjacent macro-pixels. Encoded digital data can be bilevel (1 bit) or multi-level (more than 1 bit) and come from any source.

Although the present invention has been described hereinabove by way of preferred embodiments thereof, it can be modified without departing from the spirit and nature of the subject invention as defined in the appended claims.

The invention claimed is:

1. A macro-pixel used in an image rendering process for forming an image using a matrix of said macro-pixels, said macro-pixel having a plurality of rectilinear parallel rows, all said rows extending across said matrix in the same direction, wherein each row comprises a number of micro-pixels forming rectilinear parallel columns across said matrix and each micro-pixel is capable of adopting an on state and an off state, wherein said on state includes presence of color and said off state includes absence of color, further wherein with increasing coverage of the micro-pixel, the micro-pixels are turned to the on state in a progression starting with a micro-pixel in a row and proceeding to immediately neighbouring micro-pixels in the same row.

2. The macro-pixel as in claim 1, wherein said on state comprises a key color state and a non-key color state.

3. The macro-pixel as in claim 2, wherein said non-key color state comprises at least one color selected from the group consisting of cyan, magenta, and yellow.

4. The macro-pixel as in claim 1, wherein all said rows in at least partially same state are adjacently grouped.

5. The macro-pixel as in claim 4, wherein said matrix forms a pattern whereby a maximal parallel distance exists between rows in said non-key color state and rows in said key color state.

6. The macro-pixel as in claim 2, wherein said key color state comprises at least one of the color black and a darkest color in a possible selection of color states.

7. The macro-pixel as in claim 6, wherein said non-key color state comprises at least one color selected from the group consisting of cyan, magenta, and yellow.

8. The macro-pixel as in claim 1, wherein said micro-pixels are capable of adopting said on state according to a first predetermined order.

9. The macro-pixel as in claim 8, wherein said first predetermined order is different for said non-key color state and said key color state.

10. The macro-pixel as in claim 8, further comprising upper and lower edges and wherein said first predetermined order begins with one of said micro-pixels in a row located at a substantial equidistance from said upper and lower edges thereby defining a first order micro-pixel.

11. The macro-pixel as in claim 10, further comprising left and right edges and wherein said first order micro-pixel is in a position at a substantial equidistance from said left and right edges.

12. The macro-pixel as in claim 11, wherein said first predetermined order continues with the micro-pixel in said off state which is closest to said substantial left and right edge equidistance until all micro-pixels in a row have adopted said on state.

13. The macro-pixel as in claim 12, wherein, after all micro-pixels in a row have adopted said on state, said first predetermined order further continues, in a row which is the next one closest to substantial upper and lower edge equidistance, with the micro-pixel in said off state which is closest to said substantial left and right edge equidistance.

14. The macro-pixel as in claim 13, wherein said micro-pixels are capable of adopting said on state according to a second predetermined order, wherein said on state in said first predetermined order corresponds either one of said non-key color state and said key color state and wherein said on state in said second predetermined order corresponds to the other one of said non-key color state and said key color state.

15. The macro-pixel as in claim 14, wherein said second predetermined order begins with one of said micro-pixels in a row closest to one of said upper and said lower edges thereby defining a second order micro-pixel.

16. The macro-pixel as in claim 15, wherein said second order micro-pixel is in position at a substantial equidistance from said left and right edges.

17. The macro-pixel as in claim 16, wherein said second predetermined order continues with the micro-pixel in said off state which is closest to said substantial left and right edge equidistance until all micro-pixels in a row have adopted said on state.

18. The macro-pixel as in claim 17, wherein, after all micro-pixels in a row have adopted said on state, said second predetermined order further continues, in a row which is next one closest to the other one of said upper and said lower edges, with the micro-pixel in said off state which is closest to said substantial left and right edge equidistance.

19. The macro-pixel as in claim 1, wherein said macro-pixels form odd and even numbered horizontal lines of said matrix, further wherein said micro-pixels in said odd lines are capable of adopting said on state according to one of a first predetermined order and a second predetermined order, and said even lines are capable of adopting said on state according to the other one of a first predetermined order and a second predetermined order.

20. The macro-pixel as in claim 19, further comprising upper and lower edges and wherein said first predetermined order begins with one of said micro-pixels in a row closest to said upper edge thereby defining a first order micro-pixel, and said second predetermined order begins with one of said micro-pixels in a row closest to said lower edge thereby defining a second order micro-pixel.

21. The macro-pixel as in claim 20, further comprising left and right edges and wherein said first and second order micro-pixels are in a position at a substantial equidistance from said left and right edges.

22. The macro-pixel as in claim 21, said first and second predetermined orders continue, in their respective rows, with the micro-pixel in said off state which is closest to said substantial left and right edge equidistance until all micro-pixels in a row have adopted said on state.

23. The macro-pixel as in claim 22, wherein, after all micro-pixels in a row have adopted said on state, said first predetermined order further continues, in a row which is next one closest to said upper edge, and wherein said second predetermined order further continues, in a row which is next one closest to said lower edge, with the micro-pixel in said off state which is closest to said substantial left and right edge equidistance.

24. The macro-pixel as in claim 1, wherein each row comprises at least one micro-pixel forming rectilinear parallel columns across said matrix in a direction perpendicular to said rows.

25. The macro-pixel as in claim 24, wherein said micro-pixels are capable of adopting said on state in a predetermined order.

26. The macro-pixel as in claim 1, wherein said image rendering process comprises a printing process comprising a continuous linear production direction and wherein direction of said rows is dependent on said continuous linear production direction.

27. The macro-pixel as in claim 26, wherein said row direction is perpendicular to said continuous linear production direction.

28. The macro-pixel of claim 1, further comprising parallel upper and lower edges and wherein direction of said rows relative said upper and lower edges is selected from the group consisting of 0 degrees, 90 degrees, 26.565051177 degrees, 45 degrees, and 63.434948823 degrees.

29. An image rendering method for forming an image, said method comprising:
providing a matrix of macro-pixels, each said macro-pixel having a plurality of rectilinear parallel rows, all said rows extending across said matrix in the same direction wherein each row comprises a number of micro-pixels forming rectilinear parallel columns across said matrix; and
each micro-pixel adopting an on state and an off state, wherein said on state includes presence of color and said off state includes absence of color, to thereby render said image, further wherein, with increasing coverage of the micro-pixel, the micro-pixels are turned to the on state in a progression starting with a micro-pixel in a row and proceeding to immediately neighbouring micro-pixels in the same row.

30. The method as in claim 28, wherein adopting said on state comprises adopting a key color state and a non-key color state.

31. The method as in claim 30, wherein adopting said non-key color state comprises adopting at least one color selected from the group consisting of cyan, magenta, and yellow.

32. The method as in claim 28, farther comprising adjacently grouping all said rows in at least partially same state.

33. The method as in claim 32, further comprising forming a pattern whereby a maximal parallel distance exists between rows in said non-key color state and rows in said key color state.

34. The method as in claim 30, wherein adopting said key color state comprises adopting at least one of the color black and a darkest color in a possible selection of color states.

35. The method as in claim 34, wherein adopting said non-key color state comprises adopting at least one color selected from the group consisting of cyan, magenta, and yellow.

36. The method as in claim 29, wherein said micro-pixels adopt said on state according to a first predetermined order.

37. The method as in claim 36, wherein said first predetermined order is different for said non-key color state and said key color state.

38. The method as in claim 36, further comprising determining a row located at a substantial equidistance from an upper edge and a lower edge of said macro-pixel, and wherein said first predetermined order begins with one of said micro-pixels in said upper and lower edge equidistant row thereby defining a first order micro-pixel.

39. The method as in claim 38, further comprising determining a position at a substantial equidistance from a left edge and a right edge of said macro-pixel, and wherein said first predetermined order begins with said first order micro-pixel in said left and right edge equidistant position.

40. The method as in claim 39, further comprising continuing said first predetermined order with the micro-pixel in said off state which is closest to said substantial left and right edge equidistance until all micro-pixels in a row have adopted said on state.

41. The method as in claim 40, wherein, after all micro-pixels in a row have adopted said on state, further continuing said first predetermined order, in a row which is the next one closest to substantial upper and lower edge equidistance, with the micro-pixel in said off state which is closest to said substantial left and right edge equidistance.

42. The method as in claim 41, wherein said micro-pixels adopt said on state according to a second predetermined order, wherein said on state in said first predetermined order corresponds either one of said non-key color state and said key color state and wherein said on state in said second predetermined order corresponds to the other one of said non-key color state and said key color state.

43. The method as in claim 42, further comprising determining a row closest to either one of said upper and said lower edges thereby defining a second order micro-pixel, and wherein said second predetermined order begins with one of said micro-pixels in said row closest to either one of said upper and lower edges.

44. The method as in claim 43, further comprising determining a position at a substantial equidistance from a left edge and a right edge of said macro-pixel, and wherein said second predetermined order begins with said second order micro-pixel in said left and right edge equidistant position.

45. The method as in claim 44, further comprising continuing said second predetermined order with the micro-pixel in said off state which is closest to said substantial left and right edge equidistance until all micro-pixels in a row have adopted said on state.

46. The method as in claim 45, wherein, after all micro-pixels in a row have adopted said on state, further continuing said second predetermined order, in a row which is next one closest to the other one of said upper and said lower edges, with the micro-pixel in said off state which is closest to said substantial left and right edge equidistance.

47. The method as in claim 29, wherein said macro-pixels form odd and even numbered horizontal lines of said matrix, further wherein said micro-pixels in said odd lines adopt said on state according to one of a first predetermined order and a second predetermined order, and said even lines adopt said on state according to the other one of a first predetermined order and a second predetermined order.

48. The method as in claim 47, wherein said first predetermined order begins with one of said micro-pixels in a row closest to an upper edge of said macro-pixel thereby defining a first order micro-pixel, and said second predetermined order begins with one of said micro- pixels in a row closest to a lower edge of said macro-pixel thereby defining a second order micro-pixel.

49. The method as in claim 48, further comprising determining a position at a substantial equidistance from a left edge and a right edge of said macro-pixel, and wherein said first predetermined order begins with said first order and second order micro-pixels in said left and right edge equidistant position.

50. The method as in claim 49, further comprising continuing said first and second predetermined orders, in their respective rows, with the micro-pixel in said off state which is closest to said substantial left and right edge equidistance until all micro-pixels in a row have adopted said on state.

51. The method as in claim 50, wherein, after all micro-pixels in a row have adopted said on state, further continuing said first predetermined order, in a row which is next one closest to said upper edge, and wherein said second predetermined order further continues, in a row which is next one closest to said lower edge, with the micro-pixel in said off state which is closest to said substantial left and right edge equidistance.

52. The method as in claim 28, further comprising printing said image.

53. The method as in claim 52, wherein said printing comprises producing said image in a direction of production and wherein direction of said rows is dependent on said direction of production.

54. The method as in claim 53, wherein said row direction is perpendicular to said continuous linear production direction.

55. The method as in claim 29, wherein each said provided a macro-pixel further comprises parallel upper and lower edges and wherein direction of said rows relative said upper and lower edges is selected from the group consisting of 0 degrees, 90 degrees, 26.565051177 degrees, 45 degrees, and 63.434948823 degrees.

56. The method as in claim 29, further comprising encoding digital data within said image.

57. The method as in claim 55, wherein said encoding digital data comprises encoding watermark data.

58. The method as in claim 55, wherein encoding said digital data comprises replacing said image forming macro-pixels with said digital data.

59. The method as in claim 58, wherein encoding said digital data comprises modulating said image forming macro-pixels with said digital data.

60. The method as in claim 59, wherein adopting said on state comprises adopting at least one of a key color state and a non-key color state.

61. The method as in claim 60, wherein adopting said non-key color state comprises adopting at least one color selected from the group consisting of cyan, magenta, and yellow.

62. The method as in claim 61, wherein modulating comprises using said at least one color.

* * * * *